A. TISMAN.
AUTOMOBILE BUMPER.
APPLICATION FILED AUG. 14, 1917.
1,288,292. Patented Dec. 17, 1918.
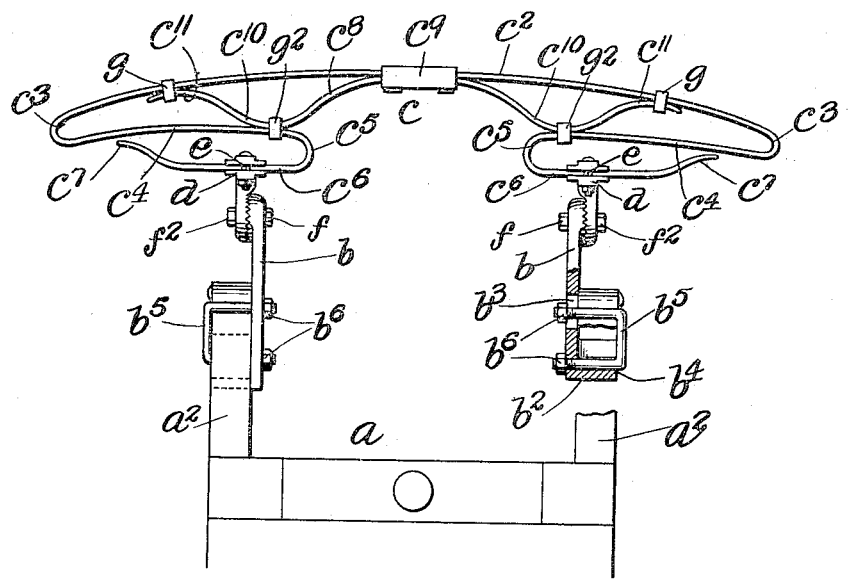
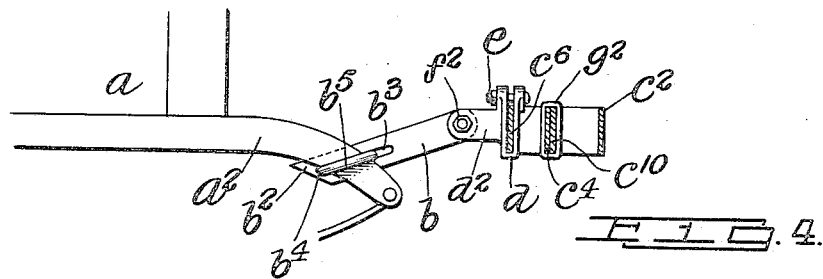
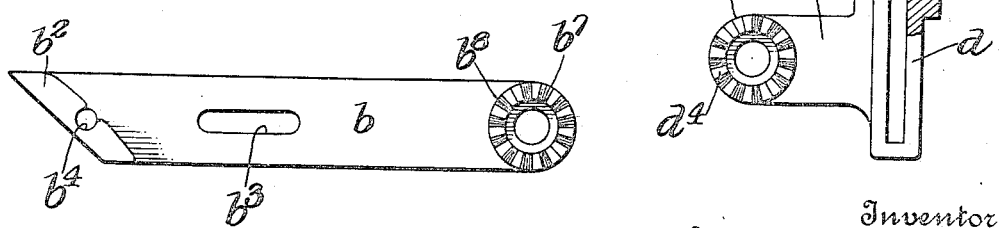
Inventor
Abraham Tisman,
By his Attorneys
Edgar Tate

UNITED STATES PATENT OFFICE.

ABRAHAM TISMAN, OF NEW YORK, N. Y.

AUTOMOBILE-BUMPER.

1,288,292.  Specification of Letters Patent.  Patented Dec. 17, 1918.

Application filed August 14, 1917. Serial No. 186,105.

*To all whom it may concern:*

Be it known that I, ABRAHAM TISMAN, a citizen of Russia, and residing at New York, in the county of New York and State of New York, have invented certain new and useful Improvements in Automobile-Bumpers, of which the following is a specification such as will enable those skilled in the art to which it appertains to make and use the same.

This invention relates to bumpers or buffers for power driven vehicles, and the object thereof is to provide improved devices for connecting a spring bumper or buffer with the chassis or framework of the vehicle which consist of two parts having no spring action and no spring connections and with one of which the spring bumper or buffer is detachably connected and the other of which is connected with the chassis or framework of the vehicle, and with this and other objects in view the invention consists in devices of the class specified, constructed and operating as hereinafter described and claimed.

This invention is an improvement on that described and claimed in U. S. Letters Patent No. 1,220,571 granted to me March 27, 1917, and said invention is fully disclosed in the following specification, of which the accompanying drawing forms a part, in which the separate parts of my improvement are designated by suitable reference characters in each of the views, and in which—

Figure 1 is a plan view showing my improvement applied to a chassis or truck frame of an automobile, part of the construction being broken away and part in section;

Fig. 2 a side view of the construction shown in Fig. 1 and partially in section; and, Figs. 3 and 4 side views of separate parts of the construction by which the bumper or buffer is connected with the chassis or truck frame, one of said parts being partially in section.

In the drawing forming part of this specification, I have shown at $a$ a part of a chassis or truck frame of a power driven vehicle, and said chassis or truck frame is provided with forwardly directed side extensions $a^2$ of the usual form, and in the practice of my invention I secure to the parts $a^2$ arms $b$ having angular foot pieces $b^2$, this connection being clearly shown in Figs. 1 and 2, in which the forwardly directed extensions $a^2$ of the chassis or truck frame are bent downwardly and the arms $b$ are placed on the inner side thereof with the foot pieces $b^2$ fitting beneath said extensions, and the arms $b$ are provided centrally with slots $b^3$, and in the end portions thereof with transverse apertures $b^4$ which form recesses in the foot pieces $b^2$, and I also provide yoke-shaped clamps $b^5$, the side arms of which are passed through the slots $b^3$ and apertures $b^4$ and are provided with nuts $b^6$.

By means of this construction the arms $b$ may be quickly and easily attached to the extensions $a^2$ of the chassis or truck frame and detached therefrom whenever desired or necessary, and said arms when in position are forwardly and upwardly inclined, and the front ends of the arms $b$ are provided with circular head members $b^7$ having lock teeth $b^8$, and the object of the slots $b^3$ in the arms $b$ is to adapt said arms for use in connection with yoke-shaped clamps $b^5$ of greater or less transverse dimensions and to adapt the entire construction for use in connection with side members $a^2$ of the chassis frame of greater or less transverse dimensions.

The bumper or buffer proper consists of a spring device $c$ comprising a main transverse plate spring member $c^2$, the end portions of which project beyond the sides of the chassis or truck frame and are formed into loops $c^3$ provided with inwardly directed members $c^4$ bent at their inner ends to form loops $c^5$ and outwardly directed spring arms $c^6$ the end portions of which are bent forwardly as shown at $c^7$, and are adapted to bear on the parts $c^4$ when pressure of any kind is applied to the parts $c^6$, and the spring bumper or buffer device $c$ is connected with the arms $b$ by means of U-shaped clamps $d$ into which the arms $c^6$ of the bumper or buffer device $c$ are dropped and secured by means of bolts $e$, and the U-shaped clamps $d$ are provided at one side thereof with short arms $d^2$ having circular heads $d^3$ provided with lock teeth $d^4$ which are adapted to engage the lock teeth $b^8$ on the head members $b^7$ of the arms $b$ and the head members $d^3$ of the arms $d^2$ are placed together as shown in Fig. 1 and secured together by bolts $f$ which are passed therethrough and provided at their outer ends with nuts $f^2$, and by means of this construction, or method of connection the spring bumper or buffer device $c$ may be raised or lowered, or adjusted vertically whenever desired. I also employ in connection with the main spring member $c^2$ of the bumper or buffer device a supplemental plate or leaf spring member $c^8$ which is connected with the inner side of the spring member $c^2$ by a suitable clamp or keeper $c^9$ through which it passes, and the end portions of which, centrally thereof, are bent backward to form loops $c^{10}$ and forward to form spring end portions $c^{11}$ which bear on the inner sides of the end portions of the spring members $c^2$ and are connected therewith by keepers $g$ through which they pass and the parts $c^{10}$ and $c^4$ are also connected by keepers $g^2$ through which they pass.

The spring bumper or buffer device $c$ constructed in the manner shown and described possesses the greatest possible elasticity and resiliency in proportion to its weight, and the parts thereof will yield to the greatest possible extent without breaking and the device may be quickly and easily connected with, or detached from the chassis or truck frame whenever desired, and the spring buffer device may be adjusted vertically to any necessary or desired extent.

It will also be seen from the foregoing description that the parts $b$ of the spring buffer attaching devices are mounted on the sides of the side extensions $a^2$ of the chassis frame and are secured thereto, instead of being mounted on the tops of said side extensions $a^2$ as has heretofore been customary, and while this connection is made on the inner sides of the side extensions $a^2$, my invention is not limited to this arrangement and the parts $b$ may be mounted on the outer sides of said side extensions, if desired.

Having fully described my invention, what I claim as new and desire to secure by Letters Patent, is:—

1. In a buffer supporting means for connecting a buffer with the chassis or frame of a vehicle having projecting side members, arm plates provided at one end with laterally directed feet which are adapted to be placed beneath said side members, said end portions of said arm plates being provided with apertures one of which is elongated, and yoke-shaped clamps adapted to be passed through said apertures and to engage the side members of the frame and provided with nuts for locking said arm plates to said side members.

2. A buffer supporting device for securing a buffer to the forwardly directed extensions of the side members of the chassis of a vehicle, comprising two supporting members, each of which consists of two parts, one of said parts of each member being provided at one end with a laterally directed foot member adapted to be placed beneath one of the extensions of the chassis, said part being secured to said extension by yoke-shaped bolts passed through apertures in said part, and the other part of each member being adjustably connected with the first named part and adapted to be connected to a buffer.

In testimony that I claim the foregoing as my invention I have signed my name in presence of the subscribing witnesses this 11th day of August 1917.

ABRAHAM TISMAN.

Witnesses:
   H. E. THOMPSON,
   C. E. MULREANY.